(12) United States Patent
Murthy

(10) Patent No.: US 8,949,811 B2
(45) Date of Patent: Feb. 3, 2015

(54) CONSTRUCTING A CONTROL FLOW GRAPH FOR A SOFTWARE PROGRAM

(75) Inventor: Praveen K. Murthy, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 192 days.

(21) Appl. No.: 13/218,805

(22) Filed: Aug. 26, 2011

(65) Prior Publication Data
US 2013/0055209 A1 Feb. 28, 2013

(51) Int. Cl.
*G06F 9/45* (2006.01)
*G06F 9/44* (2006.01)

(52) U.S. Cl.
CPC ............... *G06F 8/315* (2013.01); *G06F 8/433* (2013.01)
USPC ...................................................... 717/157

(58) Field of Classification Search
None
See application file for complete search history.

(56) References Cited

U.S. PATENT DOCUMENTS

| | | | | |
|---|---|---|---|---|
| 5,127,104 A | * | 6/1992 | Dennis | 712/201 |
| 5,881,291 A | * | 3/1999 | Piazza | 717/154 |
| 2011/0219361 A1 | * | 9/2011 | Dolby et al. | 717/136 |

FOREIGN PATENT DOCUMENTS

WO    WO 2005070139 A2 *  8/2005

OTHER PUBLICATIONS

Danvy, Olivier and Lasse R. Nielsen. "A first-order one-pass CPS transformation," 2003. Theoretical Computer Science, vol. 308, pp. 239-257.*

Guha, Arjun, Claudiu Saftoiu, and Shriram Krishnamurthi. "The Essence of JavaScript." 2010, In ECOOP, Lecture Notes in Computer Science 6183. T. D'Hondt (Editor). pp. 126-150.*

Danvy, Olivier, Chung-chieh Shan, and Ian Zerny. "J Is for JavaScript: A Direct-Style Correspondence between Algol-Like Languages and JavaScript Using First-Class Continuations" Jul. 2009, DSL '09: Proceedings of the IFIP TC 2 Working Conference on Domain-Specific Languages. W.M. Taha (Editor). pp. 1-19.*

Kiselyov, Oleg and Chung-Chieh Shan. "A Substructural Type System for Delimited Continuations", 2007. Springer-Verlag, TLCA'07 Proceedings of the 8th international conference on Typed lambda calculi and applications. pp. 223-239.*

Domoszlai, Laszlo, Eddy Bruel, and Jan Martin Jansen. "Implementing a non-strict purely functional language in JavaScript" 2011 Acta Universitatis Sapientiae, Informatica, vol. 3, No. 1, pp. 76-98.*

Sabry, Amr A., "The formal relationship between direct and continuation passing style optimizing compilers: a synthesis of two paradigms," Ph.D. Thesis, Computer Science Department, Rice University, Houston, TX, Aug. 1994, Tech. Report 94-242. p. 49.*

U.S. Appl. No. 13/218,741, filed Aug. 26, 2011, Murthy.
U.S. Appl. No. 13/218,774, filed Aug. 26, 2011, Murthy.
U.S. Appl. No. 13/218,852, filed Aug. 26, 2011, Murthy.
U.S. Appl. No. 13/218,928, filed Aug. 26, 2011, Murthy.

* cited by examiner

*Primary Examiner* — Don Wong
*Assistant Examiner* — Erika Kretzmer
(74) *Attorney, Agent, or Firm* — Baker Botts L.L.P.

(57) ABSTRACT

A method includes constructing a lambda object-oriented scripting language ($\lambda_{JS}$) model for a software program written in JavaScript; converting the $\lambda_{JS}$ model to a continuation-passing style (CPS) model for the software program; constructing a control flow graph (CFG) for the software program based on the CPS model; and optimizing the CPS model by merging a sequence of two or more "let" operations. The two or more "let" operations in the CPS model and are generated based on the $\lambda_{JS}$ model, so that they are represented by a single node in the CFG.

13 Claims, 8 Drawing Sheets

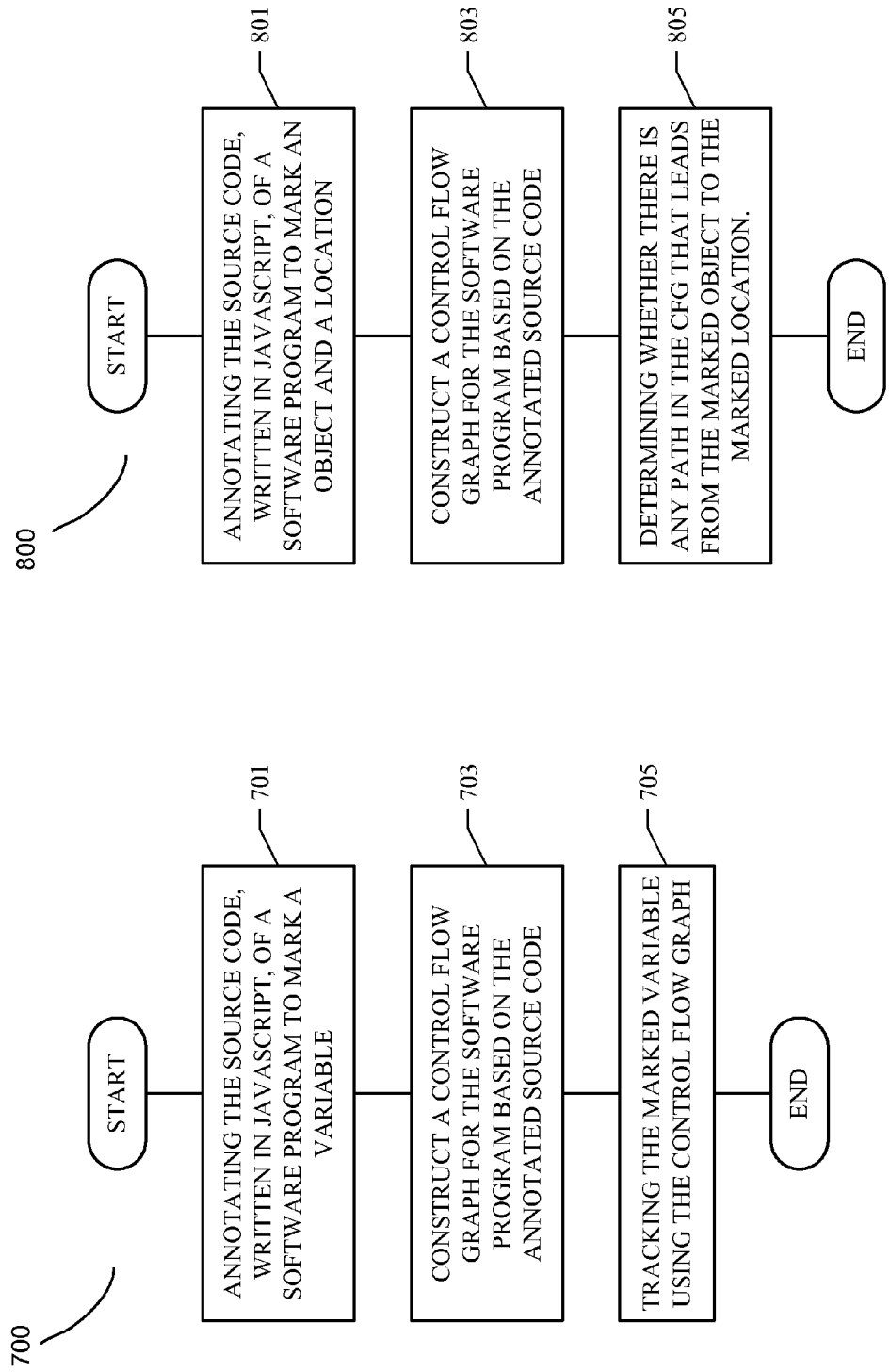

CONSTRUCTING A CONTROL FLOW GRAPH FOR A SOFTWARE PROGRAM

TECHNICAL FIELD

This disclosure generally relates to analyzing and validating computer software written in JAVASCRIPT language.

BACKGROUND

JAVASCRIPT is a prototype-based, object-oriented scripting language that is dynamic, weakly typed, and has first-class functions. It is an implementation of the ECMAScript language standard and is primarily used as a client-side scripting language. For web-based applications, JAVASCRIPT is often used to provide enhanced user interfaces and dynamic websites, enabling programmatic access to computational objects within a host environment. It is an interpretive language. Instead of compiling the source code of a software program written in JAVASCRIPT language into machine code for execution, the software program is indirectly executed (i.e., interpreted) by a JAVASCRIPT interpreter program. That is, the JAVASCRIPT interpreter interprets the JAVASCRIPT source code of the software program. Almost all web browsers currently support the capability of interpreting source code written in JAVASCRIPT language.

The JAVASCRIPT language language has some noticeable features. For example, JAVASCRIPT supports structured programming syntax, such as "if" statements, "while" loops, "switch" statements, and function-level scoping. JAVASCRIPT 1.7 also supports block-level scoping with the "let" keyword. It makes a distinction between expressions and statements. With JAVASCRIPT, types are associated with values, not with variables (i.e., dynamic typing). For example, a variable can be bound to a number at first and later rebound to a string. JAVASCRIPT is almost entirely object-based. Object properties and their values can be added, changed, or deleted at run-time. Functions are first-class and are objects themselves.

BRIEF DESCRIPTION OF THE DRAWINGS

FIG. 7 illustrates an example method for tracking variables of a software program written in JAVASCRIPT language.

FIG. 8 illustrates an example method for performing taint analysis on a software program written in JAVASCRIPT language.

DESCRIPTION OF EXAMPLE EMBODIMENTS

Figure 1:
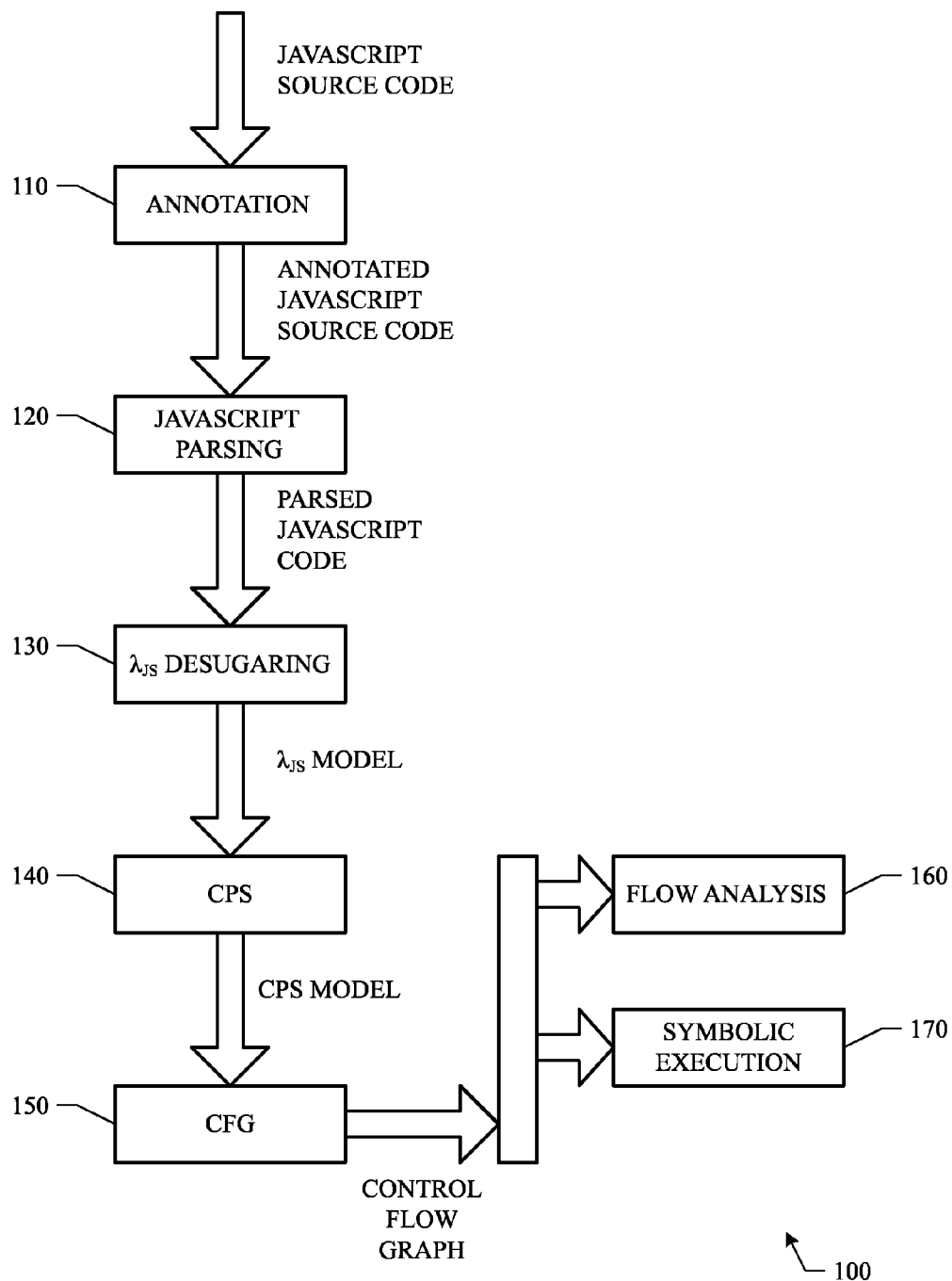
FIG. 1 illustrates an example system for analyzing and validating computer software written in JAVASCRIPT language.

JAVASCRIPT is a client-side scripting language often used in web-based applications. Particular embodiments analyze and validate software source code written in JAVASCRIPT language using control flow graphs. In particular embodiments, a control flow graph is constructed for a software program written in JAVASCRIPT language. Note that a program may include one or more modules (e.g., objects, classes, functions, etc.). Various types of analysis and validation (e.g., bug detection, symbolic execution, taint analysis, or sensitive-value tracking) are then performed for the software program using the control flow graph.

JAVASCRIPT has certain features that are unlike other programming languages, such as C or Java. The language's semantic and syntax definition may result in various implicit behaviors at run-time that are not explicit and clear in the source code written in JAVASCRIPT language. For example, JAVASCRIPT does not enforce variable types, so that a variable declared one type can be assigned a value of another type. A function may redefine itself dynamically each time it is invoked (e.g., called), so that the same function may behave differently or provide different results at different times. Consequently, code written in JAVASCRIPT language may become very complex at run-time, and it may be very difficult to detect bugs and vulnerabilities (e.g., security vulnerabilities) in the code.

To further illustrate, consider the following sample code written in JAVASCRIPT language.

SAMPLE CODE 1

```
1    function lookup(obj, name) {
2        if (name === "badfield") {
3            return "not allowed!";
4        }
5        else {
6            return obj[name];
7        }
8    }
9    var sneaky_obj = new Object( );
10   sneaky_obj["toString"] = function( ) {return "badfield";}
11   var x = lookup(o, sneaky_obj);
```

In the above example, the "lookup" function, at lines 1-8, returns the object identified by the "name" input variable. Here, "name" is intended to be of type "String". The function performs a sanity check at line 2. If "name" has the value "badfield", then no valid object is returned. Because JAVASCRIPT does not enforce variable types, this sanity check can be circumvented by, for example, the code at lines 9-11. The "sneaky_obj" variable is of the type "Object", and its "toString" function returns the string "badfield". When invoking the "lookup" function at line 11, "sneaky_obj" is used as the value assigned to the "name" input variable. Again, assigning "sneaky_obj" of type "Object" to "name" is allowed because JAVASCRIPT does not enforce variable types. As a result, comparing "name" to "badfield" at line 2 becomes comparing "sneaky_obj" to "badfield". Since "===" is the strict equal operator and only returns a Boolean TRUE if the two operands are equal and of the same type, the "if" statement at line 2 evaluates to a Boolean FALSE because "sneaky_obj" is not a string and thus the two operands do not have the same type. The "else" statement at line 5 is then executed and the object identified by "badfield" is returned at line 6. Obviously, this result is contrary to what the programmer has intended.

The following sample code illustrates a different implementation of the "lookup" function so that the sanity check for "badfield" as an input value for "name" cannot be similarly circumvented.

SAMPLE CODE 2

```
1    function lookup(obj, name) {
2        if (typeof name !== "string" || name === "badfield") {
3            return "not allowed!";
4        }
5        else {
6            return obj[name];
7        }
8    }
9    var sneaky_obj = new Object( );
10   sneaky_obj["toString"] = function( ) {return "badfield";}
11   var x = lookup(o, sneaky_obj);
```

In this version of the "lookup" function, the sanity check at line 2 validates both the type and the value assigned to the "name" input variable. After invoking the "lookup" function and assigning "sneaky_obj" to the "name" input variable at line 11, the "if" statement at line 2 evaluates to a Boolean TRUE because "sneaky_obj" is not a string. As a result, no valid object is returned by the "lookup" function.

The above example illustrates how the implicit behaviors found at run-time for JAVASCRIPT code as a result of the language's semantic and syntax features may cause errors and vulnerabilities in the code. Particular embodiments may analyze and validate software written in JAVASCRIPT language using control flow graphs in order to catch at least some of such errors and vulnerabilities in the source code.

FIG. 1 illustrates an example system 100 for analyzing and validating computer software written in JAVASCRIPT language. System 100 includes several components. In particular embodiments, each component may be implemented as computer hardware, software, or a combination thereof. The functionalities of each component are described in more detail below.

Given a software program written in JAVASCRIPT language, particular embodiments may construct a control flow graph for the software program by analyzing its source code. In computer science, a control flow graph (CFG), also referred to as a flow analysis graph, is a representation, using graph notation, of all paths that may be traversed through a software program during its execution. Each node in a CFG represents a basic block (e.g., a straight-line piece of code without any jumps or jump targets, with jump targets starting a block and jumps ending a block). Each directed edge in the CFG represents a jump in the control flow. In most representations, there are two specially designated blocks: the "ENTRY" block, through which control enters into the flow graph, and the "EXIT" block, through which all control flow leaves. Control flow analysis is a static code analysis technique for determining the control flow of a software program.

Figure 2:
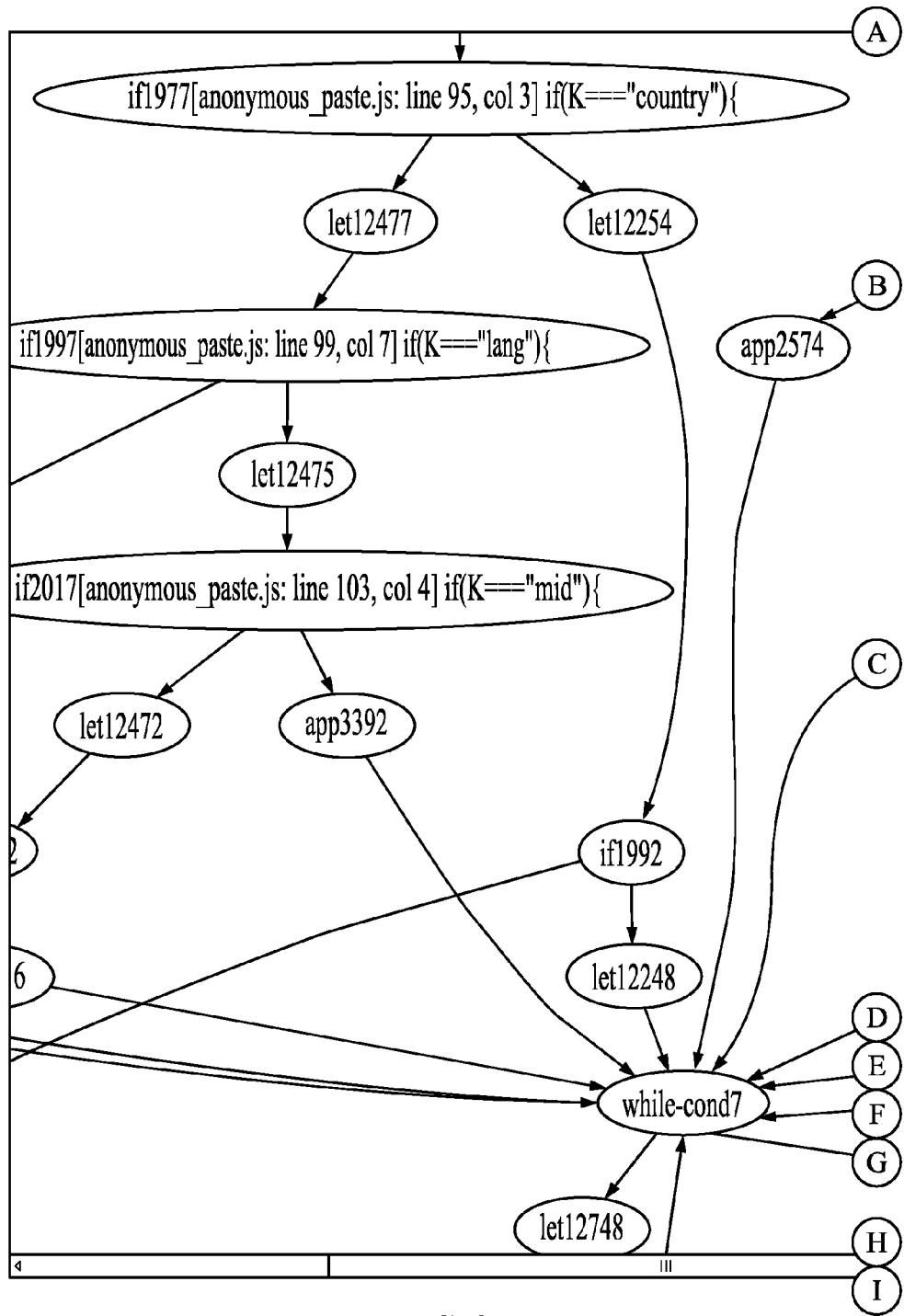
FIG. 2 illustrates a portion of an example control flow graph.
Figure 2:
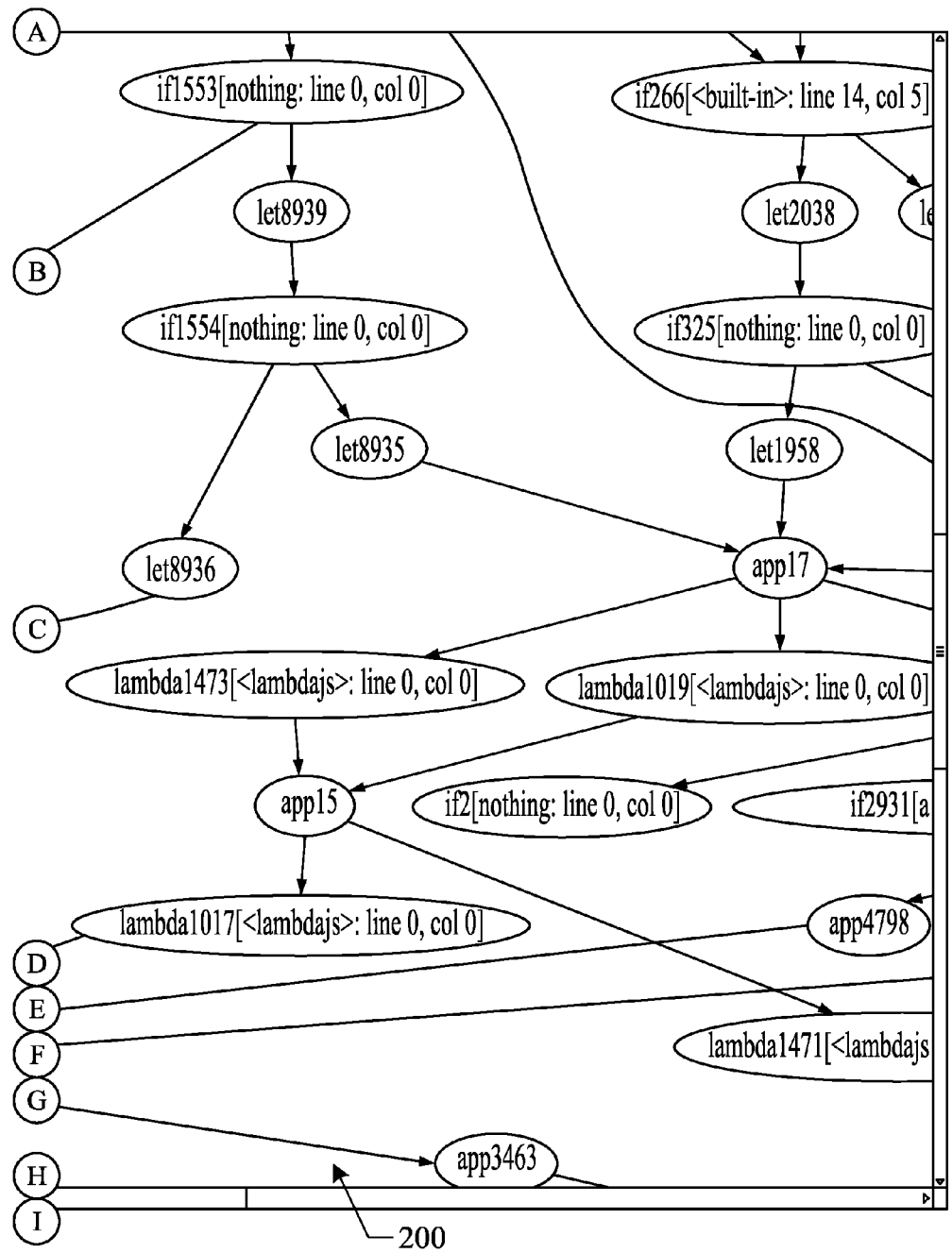

CFGs are essential to many code analysis tools. For example, reachability is a useful graph property. If a block or sub-graph is not connected from the sub-graph containing the "ENTRY" block, that block or sub-graph is unreachable during any execution, and so corresponding to unreachable code. If the "EXIT" block is unreachable from the "ENTRY" block, it indicates an infinite loop in the code. FIG. 2 illustrates a portion of an example control flow graph 200. There are a few nodes and edges in FIG. 2 for illustration purposes only, and the "ENTRY" and "EXIT" blocks are not shown in FIG. 2. In practice, a CFG may be very complicated, containing many nodes interconnected via many directed edges.

Figure 3:
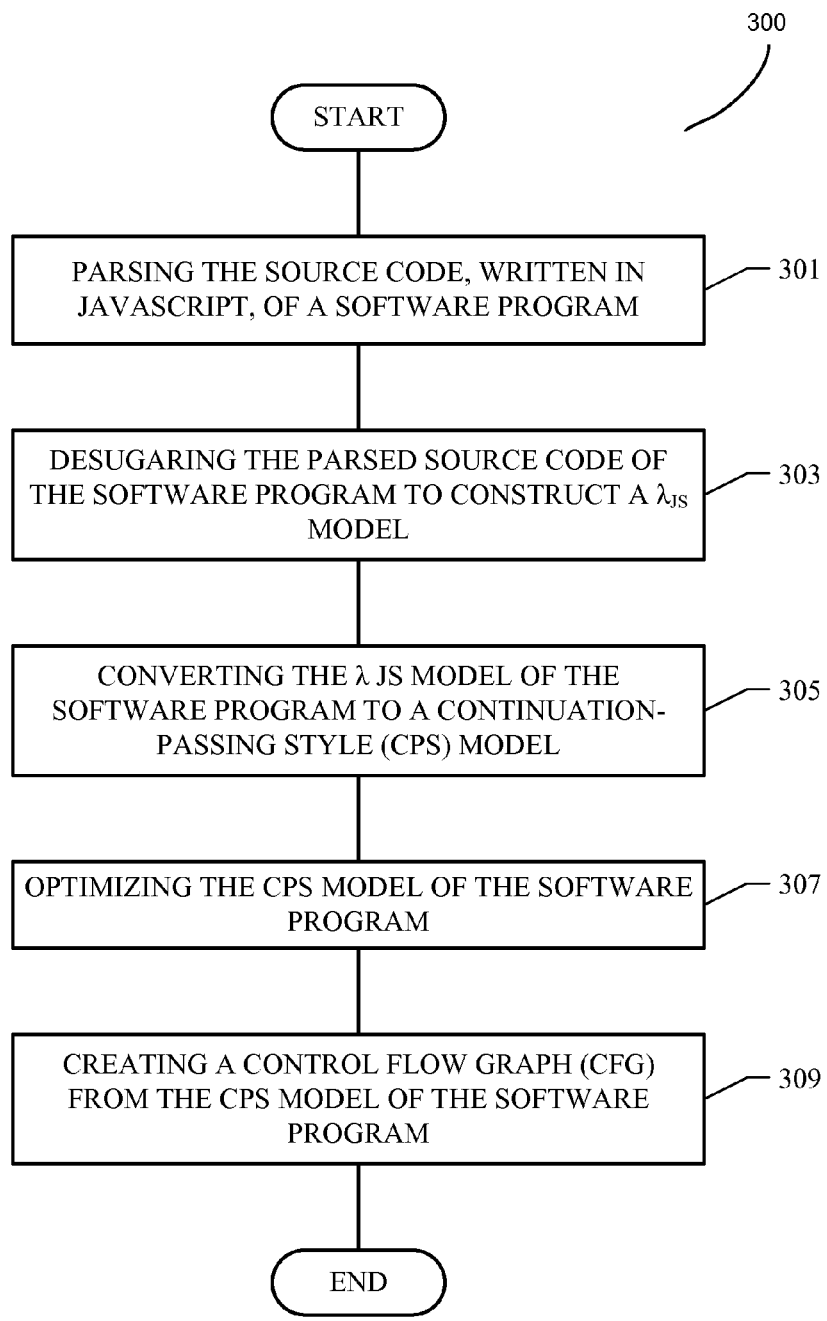
FIG. 3 illustrates an example method for constructing a control flow graph for a software program written in JAVASCRIPT language.

FIG. 3 illustrates an example method 300 for constructing a control flow graph for a software program written in JAVASCRIPT language. Given a software program written in JAVASCRIPT language, particular embodiments may parse the source code of the software program using a suitable JAVASCRIPT parser, as illustrated in STEP 301. In particular embodiments, this step may be performed by a JAVASCRIPT parsing component 120 illustrated in FIG. 1. There are several JAVASCRIPT parsers that may be suitable for parsing the source code of the software program. For example, Rhino JAVASCRIPT parser developed by Mozilla Foundation may be used to parse the source code of the software program. While parsing the source code, Rhino JAVASCRIPT parser may create various intermediate structures, which may be used during subsequent steps.

Particular embodiments may desugar the parsed source code of the software program to construct a $\lambda_{JS}$ (lambda-JS) model for the software program, as illustrated in STEP 303. In particular embodiments, this step may be performed by a $\lambda_{JS}$ desugaring component 130 illustrated in FIG. 1, which takes the parsed source code of a software program as input and produces a $\lambda_{JS}$ model of the software program as output. $\lambda_{JS}$ is a set of JAVASCRIPT t semantics, together with tools, tests, and mechanized semantics implemented as computer software, developed by researchers at Brown University. The core language embodies JAVASCRIPT's essential features. Source code written in JAVASCRIPT language can be desugared into $\lambda_{JS}$. Desugaring handles notorious JAVASCRIPT features such as "this" and "with" so that $\lambda_{JS}$ itself remains relatively simple. Both $\lambda_{JS}$ and desugaring can be mechanized.

When a software program written in JAVASCRIPT language is desugared into an equivalent program implemented using $\lambda_{JS}$ semantics to create a $\lambda_{JS}$ model, the $\lambda_{JS}$ program behaves exactly the same as the original JAVASCRIPT program. There is no new behavior added to or existing behavior deleted from the $\lambda_{JS}$ program. At the same time, all the implicit behaviors in the JAVASCRIPT program become explicit in the $\lambda_{JS}$ program, which makes the amount of code of the $\lambda_{JS}$ program usually more than the amount of code of the JAVASCRIPT program. On the other hand, since there is no implicit behavior in a $\lambda_{JS}$ program, the interpreter for $\lambda_{JS}$ programs is simpler than the interpreter for JAVASCRIPT programs.

The following illustrates the "lookup" function from SAMPLE CODE 2 after being converted into $\lambda_{JS}$ semantics.

```
(update-field (deref $global)
    "lookup"
    (alloc (object ("$code" (lambda (this arguments)
    (let ((obj (get-field (deref (deref arguments)) "0")))
    (let ((field (get-field (deref (deref arguments)) "1")))
        (let ( )
        (label $return
        (begin
            (let (($1Or (if (prim "===" (prim "typeof" field)
                    "string") #f #t)))
                (if (prim "prim->bool" $1Or) $1Or
                    (prim "===" field "badfield")))
                (break $return "not allowed!")
                (break $return (get-field (deref (let (($0 obj))
            (if (prim "===" (prim "typeof" $0) "undefined")
                (throw (app $makeException "TypeError")
    ...)))
```

As this example illustrates, the $\lambda_{JS}$ version is more explicit than the original JAVASCRIPT version of the "lookup" function, and thus has more code. In fact, there are about two hundred more lines of code not shown for the $\lambda_{JS}$ version.

Particular embodiments may convert the $\lambda_{JS}$ model of the software program to a continuation-passing style (CPS) model, as illustrated in STEP 305. In particular embodiments, this step may be performed by a CPS component 140 illustrated in FIG. 1, which takes a $\lambda_{JS}$ model of a software program as input and produces a CPS model of the software program as output.

In functional programming, CPS is a style of programming in which control is passed explicitly in the form of a continuation, which is an abstract representation of the control state of a software program. For example, instead of returning values as in the more common direct style, a function written in continuation-passing style takes an explicit "continuation" argument (i.e., a function that is meant to receive the result of the computation performed within the original function). Similarly, when a subroutine is invoked within a CPS function, the calling function is required to supply a procedure to be invoked with the subroutine's "return" value. Expressing code in this form makes a number of things explicit, which are implicit in direct style. These may include: procedure returns, which become apparent as calls to a continuation; intermediate values, which are all given names; orders of argument evaluation, which are made explicit; and tail calls, which are calling a procedure with the same continuation that has been passed to the caller, unmodified.

In particular embodiments, there are only three types of operations found in CPS models: "let", "if", and "app". All other types of operations (e.g., "while", "break", etc.) in the $\lambda_{JS}$ model are removed. The "let" operation is a straight assignment (e.g., "let y=x" assigns the value of "x" to "y"). The "if" operation causes a branching in an execution path based on some branching condition or conditions. The "app" operation applies a function call (e.g., "app lookup" invokes the "lookup" function).

Particular embodiments may optimize the CPS model of the software program, as illustrated in STEP 307, so that the CFG eventually constructed for the software program has less number of nodes. For example, an uninterrupted sequence of "let" operations may be merged so that they are represented by a single node in the CFG constructed during the subsequent step (e.g., a sequence of "let" operations, "let b=a; let d=c; let f=e" can be merged into one node in the CFG).

Particular embodiments may analyze the execution paths in the CPS model of the software program and construct a CFG for the software program, as illustrated in STEP 309. In particular embodiments, this step may be performed by a CFG component 150 illustrated in FIG. 1, which takes a CPS model of a software program as input and produces a CFG of the software program as output. An example CFG 200 is illustrated in FIG. 2. Each path through CFG 200 (e.g., formed by nodes and directed edges) corresponds to an execution path of the software program represented by CFG 200. The nodes correspond to the operations (e.g., "let", "if", "app", "lambda") found in the software program. In particular embodiments, the CPS model of the software program may be analyzed to determine all the execution paths and the operations along these paths for the software program, and the CFG may be constructed accordingly to represent these paths and operations.

Since a CFG contains all the execution paths and the operations along these paths of a software program, the CFG may be used to analyze the software program, such as catching errors in the source code, tracking variables, or performing taint analysis or symbolic execution.

Figure 4:
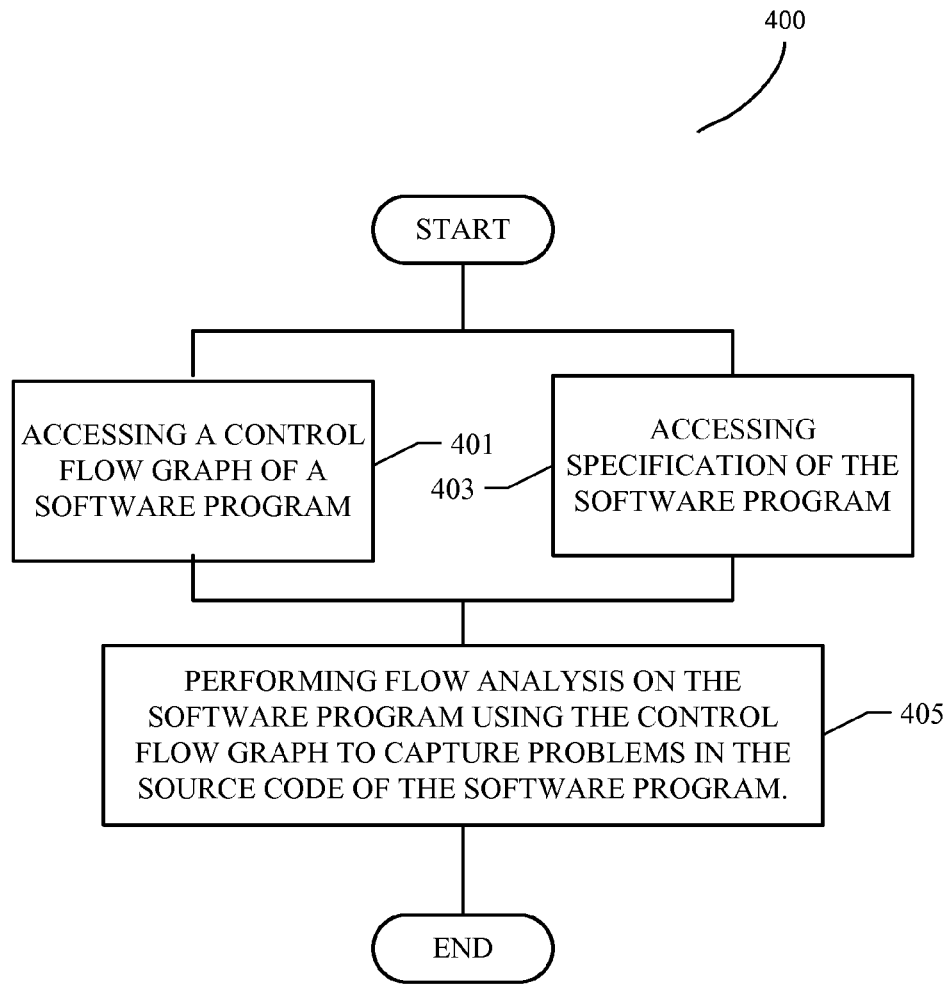
FIG. 4 illustrates an example method for performing flow analysis on a software program written in JAVASCRIPT language.

FIG. 4 illustrates an example method 400 for performing flow analysis on a control flow graph of a software program written in JAVASCRIPT language in order to capture problems in the source code of the program. In particular embodiments, the flow analysis may be automatically performed by a flow analysis component 160 illustrated in FIG. 1. Alternatively, in other embodiments, the flow analysis may be performed manually (e.g., by a software engineer or computer programmer).

Suppose that a CFG has been constructed for a software program written in JAVASCRIPT language (e.g., using the method illustrated in FIG. 3). Optionally, in particular embodiments, this CFG may be represented using a suitable data structure and stored in a computer-readable medium. Particular embodiments may access the CFG of the software program, as illustrated in STEP 401. Typically, there are design specification or requirements for the software program, which may indicate the proper behavior or the correct input or output of the software program. Such specification or requirements may be used during the flow analysis of the software program to help determine whether a specific behavior or response of the software program is correct. Particular embodiments may access the design specification or requirements of the software program, as illustrated in STEP 403. In particular embodiments, if the flow analysis is performed automatically, then the specification may be expressed as a set of formal requirements that the software program must satisfy. Each formal requirement may be represented in a predefined syntax.

Particular embodiments may perform flow analysis on the software program using the CFG of the software program and optionally, in reference to the specification of the software program, to catch problems (e.g., bugs), if any, in the source code of the software program, as illustrated in STEP 405. There may be various types of code problems that may be captured by analyzing the CFG. For example, if an execution path in the CFG produces a prohibited output or result, this indicates that there are errors (i.e., bugs) in the source code that cause the prohibited output to be produced. If there is a portion of the CFG that is unreachable, this indicates that the code corresponding to that portion of the CFG can never be executed. A portion of the CFG may throw an exception, may be unreliable, or may provide unintended or abnormal behavior or result. Particular embodiments may analyze the CFG to determine if there is any portion of the CFG (e.g., a node, a sub-graph, or an execution path) that violates a formal requirement of the software program. If so, it is an indication that there are problems or errors in the source code of the software program. If no, it is an indication that the software program is valid (e.g., behaving as it is designed to or no error in its source code).

Figure 6:
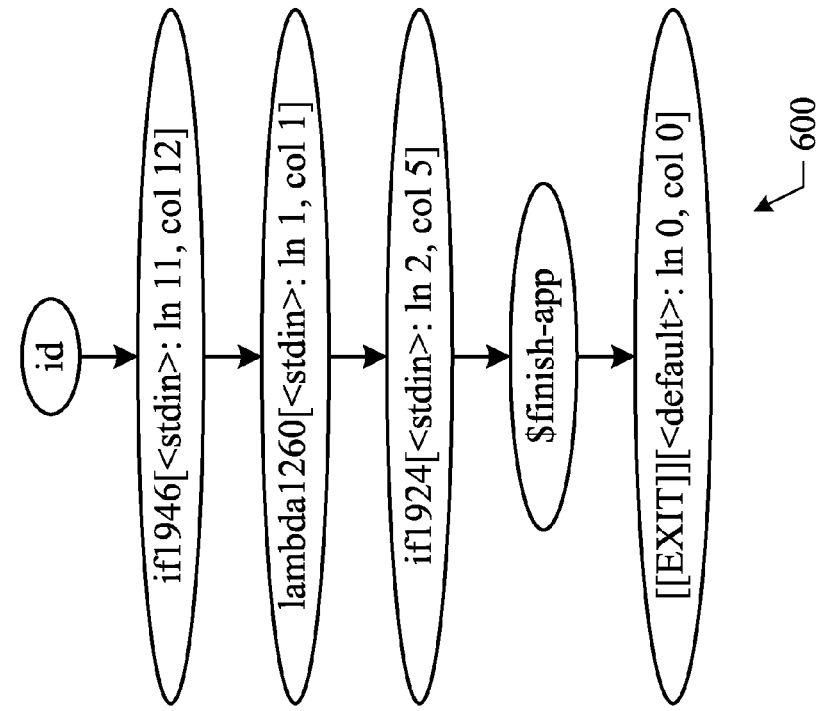
FIGS. 5-6 illustrate portions of two example control flow graphs.
Figure 5:
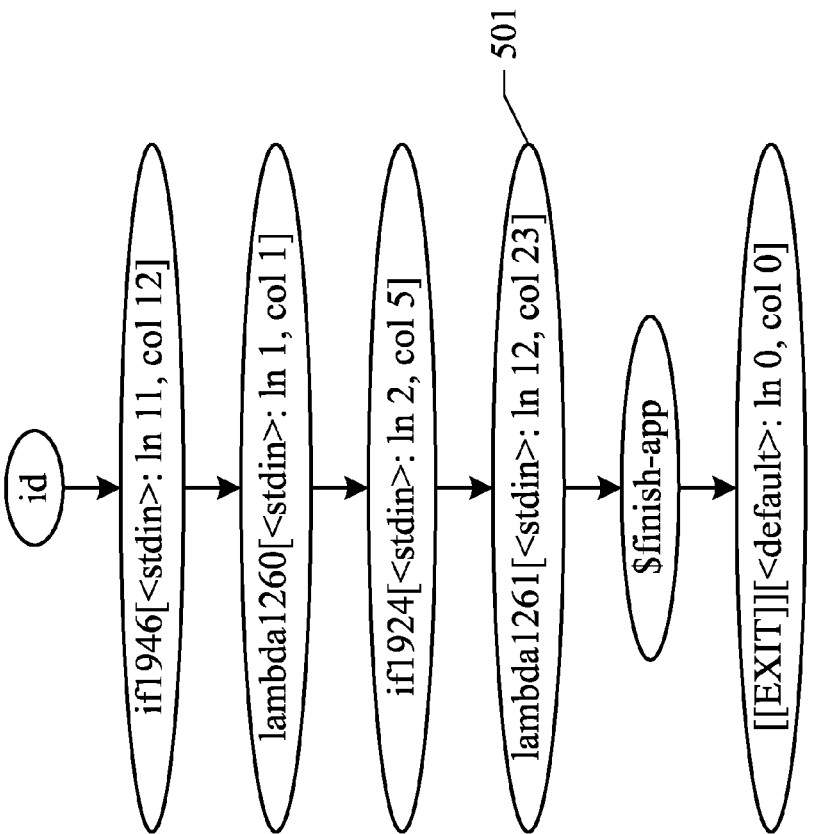

To further explain the flow analysis for a software program, consider the two versions of the example "lookup" function above. FIG. 5 illustrates a portion of a CFG 500 corresponding to the first version of the "lookup" function illustrated in SAMPLE CODE 1; and FIG. 6 illustrates a portion of a CFG 600 corresponding to the second version of the "lookup" function illustrated in SAMPLE CODE 2. The specification of the "lookup" function indicates that the function should not return any valid object if the name of the object, as indicated by the "name" variable, is "badfield". Thus, if there is any execution path in either CFG that results in a valid object to be returned by the "lookup" function when the name of the object is "badfield", then there are errors in the corresponding version of the source code of the "lookup" function.

Comparing CFGs 500 and 600, there is an extra node 501 in CFG 500 that is not found in CFG 600. Node 501 is where a valid object can be returned by the "lookup" function when the name of the object is "badfield", and thus the section of the function's code corresponding to node 501 has a bug. Recall that for the version of the "lookup" function illustrated in SAMPLE CODE 1, the sanity check against "badfield" at line 2 can be circumvented because JAVASCRIPT does not enforce variable types. This bug in the version of the source code illustrated in SAMPLE CODE 1 can be captured as a result of examining the extra node 510 in CFG 500, which corresponds to the version of the source code illustrated in SAMPLE CODE 1. For the version of the "lookup" function illustrated in SAMPLE CODE 2, the sanity check against "badfield" at line 2 cannot be circumvented because in this case, both the type and the value of the "name" variable are validated. Consequently, there is no execution path in CFG 600, which corresponds to the version of the source code illustrated in SAMPLE CODE 2, where a valid object can be returned by the lookup" function when the name of the object is "badfield". By analyzing CFG 500 corresponding to the first version of the "lookup" function, the error in this version of the source code may be located.

In particular embodiments, specific objects (e.g., variables) in the source code of a software program may be tracked using a CFG of the software program to determine where in the code the objects are accessed. FIG. 7 illustrates an example method 700 for tracking variables of a software program written in JAVASCRIPT language. Particular embodiments may annotate the source code of the program to indicate which variables in the program should be tracked, as illustrated in STEP 701. In particular embodiments, this step may be performed by an annotation component 110 illustrated in FIG. 1, which takes the JAVASCRIPT source code of a software program as input and produces the annotated source code of the software program as output. Note that any number of variables in a software program may be tracked. In particular embodiments, each variable in the source code to be tracked may be marked with "_mark_", and each location in the source code where the marked variable is examined is identified with "_examine_". Note that a variable may be examined at one or more locations in the code.

In particular embodiments, "_mark_" and "_examine_" are predefined objects (e.g., functions) that flag the variable and cause the variable to be examined at specific locations in the code. This allows any heap location to be marked in the source code, and then the CFG may be used to determine what statements or parts of the code access this marked variable or value.

To further illustrate, consider the following sample code written in JAVASCRIPT language.

---

SAMPLE CODE 3

```
1   var params = { };
2   function init( ) {
3       var s = document.location.href;
4       temp_params = {s.substring(...)};
5       params = temp_params;
6   }
7   function getString(key) {
8       return params[key];
9   }
10  function gadget( ) {
11      document.write("..." + getString("myname") + "...");
12  }
13  init( );
14  gadget( );
```
---

Suppose that the "document.location.href" variable is to be tracked to determine where and how this variable is accessed when the software is executed. The source code may be annotated so that "document.location.href" is flagged. The following sample code includes the annotated code added to SAMPLE CODE 3.

---

SAMPLE CODE 4

```
1   _mark_(document.location.href, "DANGEROUS");
2   document.write = function(str) {
3       _examine_("Checking document.write argument", str);
4   }
5   var params = { };
6   function init( ) {
7       var s = document.location.href;
8       temp_params = {s.substring(...)};
9       params = temp_params;
10  }
11  function getString(key) {
12      return params[key];
13  }
14  function gadget( ) {
15      document.write("..." + getString("myname") + "...");
16  }
17  init( );
18  gadget( );
```
---

In this case, at line 1, "_mark_" is used to flag the variable so that it is tracked. The term "DANGEROUS" is a predefined keyword indicating that the variable may have sensitive values, and thus should be tracked. Other predefined keywords may be used for variables having different characteristics. At lines 2-4, "_examine_" causes the marked variable to be examined in "document.write" (e.g., printing out the value of the marked variable).

Particular embodiments may construct a CFG for the software program based on the annotated source code, as illustrated in STEP 703 (e.g., using the method illustrated in FIG. 3). The added annotation code (e.g., "_mark_" and "_examine_") does not change the control flow of the software program, but may cause several extra nodes, corresponding to the added code, to be included in the CFG. For example, "_examine_" may correspond to an "app" operation.

Particular embodiments may track each marked variable using the CFG to determine where and how the variable is accessed when the code is executed, as illustrated in STEP 705. In particular embodiments, this step may be performed by flow analysis component 160 illustrated in FIG. 1, which takes the CFG of a software program as input and reports the results of the analysis as output.

In particular embodiments, each marked variable in the source code corresponds to a specific node in the CFG. To track a variable, each path leading from the corresponding node may be followed to determine to which subsequent node in the CFG the path may lead. For example, consider SAMPLE CODE 4 where "document.location.href" has been marked for tracking. There is a node, referred to as node 1, in the CFG of SAMPLE CODE 4 corresponding to "document.location.href".

First, the "init" function is invoked at line 17. Within "init", "document.location.href" is assigned to variable "s" at line 7; the equivalent contents of "document.location.href" in the variable "s" are modified by "s.substring" and the result assigned to variable "temp_params" at line 8; and "temp_params" is assigned to variable "params" at line 9. Thus, in the CFG, there is an execution path leading from node 1 to the node corresponding to the code at line 7, and then to the node corresponding to the code at line 8, and then to the node corresponding to the code at line 9.

Second, the "gadget" function is invoked at line 18. Within "gadget", "document.write" invokes "getString" at line 15, which in turn accesses "params". Since "params" depends on "document.location.href", "document.write" also depends on "document.location.href". In the CFG, there is an execution path leading from node 1 eventually to the node corresponding to the code at line 15.

By tracing the execution paths (i.e., flows) in a CFG leading from the node corresponding to a marked variable, particular embodiments may determine where and how (e.g., used, modified, etc.) in the source code the variable is accessed when the software is executed, which may not be readily obvious by merely examining the source code itself. In the above example, if looking at the source code for the "gadget" function, it only shows that "getString" is invoked. And looking at the source code for the "getString" function, only "params" is accessed and there is no indication that "document.location.href" is accessed. However, because in the CFG there is a path leading from the node corresponding to "document.location.href" to the node corresponding to the code at line 15, this indicates that "document.location.href" is accessed by the code at line 15.

Particular embodiments may report the execution paths that lead from or contain the node corresponding to a marked variable (e.g., as stack traces). For example, with "_examine_", at each identified location, the stack trace may be printed out. The following illustrate an example stack trace corresponding to a path containing the node corresponding to a marked variable. The stack trace shows corresponding lines in the source code as well.

```
The mark DANGEROUS was found, on the value {(Any
String)@{DANGEROUS}, (Any String)@{ }, }
[anonymous_paste.js: line 1, col 1]
___mark___(document.location.href, "DANGEROUS");
[anonymous_paste.js: line 11, col 15]
gadgets.util=(function( ){
[anonymous_paste.js: line 140, col 16] var
_IG_Prefs=(function( ){
[anonymous_paste.js: line 173, col 1] load(new
_IG_Prefs(___MODULE_ID___));
[anonymous_paste.js: line 143, col 2] if(!A){
[anonymous_paste.js: line 122, col 5] if(!I){
[anonymous_paste.js: line 123, col 2] C( ) ;
[anonymous_paste.js: line 35, col 6] if(E!==null&&typeof
Q==="undefined"){
[anonymous_paste.js: line 40, col 12] var
J=G(Q||document.location.href);
[anonymous_paste.js: line 17, col 2] if(J===-1){
[anonymous_paste.js: line 44, col 3] if(N===-1) {
[anonymous_paste.js: line 44, col 3] if(N===-1) {
[anonymous_paste.js: line 50, col 8] M[I]=O(P)
[anonymous_paste.js: line 52, col 6] if(typeof
Q==="undefined"){
[anonymous_paste.js: line 90, col 2]
if(L.hasOwnProperty(K)){
[anonymous_paste.js: line 91, col 6]
if(K.indexOf("up_")===0&&K.length>3){
[anonymous_paste.js: line 92, col 18]
J[K.substr(3)]=String(L[K]);
[anonymous_paste.js: line 90, col 2]
if(L.hasOwnProperty(K)){
[anonymous_paste.js: line 91, col 6]
if(K.indexOf("up_")===0&&K.length>3){
[anonymous_paste.js: line 95, col 3] if(K==="country"){
[anonymous_paste.js: line 90, col 2]
if(L.hasOwnProperty(K))
[anonymous_paste.js: line 91, col 6]
if(K.indexOf("up_")===0&&K.length>3){
[anonymous_paste.js: line 92, col 18]
J[K.substr(3)]=String(L[K]);
[anonymous_paste.js: line 90, col 2]
if(L.hasOwnProperty(K)){
[anonymous_paste.js: line 91, col 6]
if(K.indexOf("up_")===0&&K.length>3){
[anonymous_paste.js: line 95, col 3] if(K==="country"){
[anonymous_paste.js: line 99, col 7] if(K==="lang"){
[anonymous_paste.js: line 90, col 2]
if(L.hasOwnProperty(K)){
```

-continued

```
[anonymous_paste.js: line 91, col 6]
if(K.indexOf("up_")===0&&K.length>3){
[anonymous_paste.js: line 95, col 3] if(K==="country"){
[anonymous_paste.js: line 99, col 7] if(K==="lang"){
[anonymous_paste.js: line 103, col 4] if(K==="mid"){
[anonymous_paste.js: line 124, col 2] G( );
[anonymous_paste.js: line 134, col 5] if(K===".lang") {
[anonymous_paste.js: line 137, col 12] return F(J[K]);
[anonymous_paste.js: line 5, col 5] ___examine___("Argument
to document.write: ", str);
```

In particular embodiments, these paths may be inspected to catch bugs, if any, in the source code, especially bugs in connection with the marked variable (e.g., the marked variable is modified when it should not be modified).

In particular embodiments, tracking variables throughout a software program may help perform taint analysis. Sometimes, there may be bad (e.g., unsecure or untrustworthy) variables accessed by a software program. For example, these bad variables may be user input variables that may have questionable values. It may not be advisable to have good (e.g., sensitive) code accessing these bad variables. Conversely, sometimes, there may be good (e.g., sensitive) variables, such as global objects (e.g., documents) involved in the software program, and it may not be advisable to have bad (e.g., unsecure or untrustworthy) code accessing these good variables. For example, the bad code may be third-party, and thus untrustworthy, functions. Note that what is considered good or bad may be determined by software designers or developers (e.g., based on the specification or requirements of the software). An object may be considered bad in one instance but neutral or good in another instance.

As an example, a web page may contain various contents, including the page's primary contents and advertisements. The advertisements may be managed by a function supplied by an advertiser (e.g., a third party), while the primary contents may be managed by functions implementing the web site to which the web page belongs. It may not be advisable to allow the function supplied by the third-party advertiser to access or modify the primary contents in the page. In this case, taint analysis may be used to ensure that the function supplied by the third-party advertiser does not access the primary contents in the page.

FIG. 8 illustrates an example method 800 for performing taint analysis. Particular embodiments may annotate the source code of a software program to mark objects and locations, as illustrated in STEP 801. In particular embodiments, this step may be performed by annotation component 110 illustrated in FIG. 1, which takes the JAVASCRIPT source code of a software program as input and produces the annotated source code of the software program as output. Note that any number of objects and locations in a software program may be marked. For example, an object may be a variable, and a location may be a function in the source code.

In particular embodiments, each object in the source code may be marked with "_mark_", and each location may be identified with "_examine_". This causes the marked object to be examined at the specified location. In particular embodiments, good objects may be marked to be examined at bad locations. Conversely, bad objects may be marked to be examined at good locations. Again, what is considered good or bad may depend on the specification of the software.

Particular embodiments may construct a CFG for the software program based on the annotated source code, as illustrated in STEP 803 (e.g., using the method illustrated in FIG.

3). In the CFG, each marked object or identified location corresponds to a specific node.

Particular embodiments may track each marked object using the CFG to determine whether there is a path leading from the node corresponding to the marked object to the node corresponding to the identified location, as illustrated in STEP 805. In particular embodiments, this step may be performed by flow analysis component 160 illustrated in FIG. 1, which takes the CFG of a software program as input and reports the results of the analysis as output. More specifically, in particular embodiments, each good object is paired with one or more bad locations when annotating the source code (e.g., using "_mark_" and "_examine_"). Conversely, each bad object is paired with one or more good locations when annotating the source code. When examining the CFG, for each good object, particular embodiments may determine whether there is any path leading from the node corresponding to the good object to the node corresponding to any paired bad location in the CFG. Similarly, for each bad object, particular embodiments may determine whether there is any path leading from the node corresponding to the bad object to the node corresponding to any paired good location in the CFG. If so, particular embodiments may alert the software developers because a bad location is accessing a good object or a good location is accessing a bad object. The software developers may then use the information to modify the source code if necessary.

In particular embodiments, symbolic execution may be performed on a software program written in JAVASCRIPT language using the CFG of the software program. Symbolic execution is a non-explicit state model-checking technique that treats input to a software program as symbol variables. It creates complex equations by executing all finite paths in the software program with symbolic variables and then solves the complex equations with a solver, typically known as a decision procedure, to obtain error scenarios, if any. In contrast to explicit state model checking, symbolic execution is able to work out all possible input values and all possible use cases of all possible input values in the software program under analysis. Symbolic execution can be used to automatically generate test inputs with high structural coverage for the program under analysis.

Figure 9:
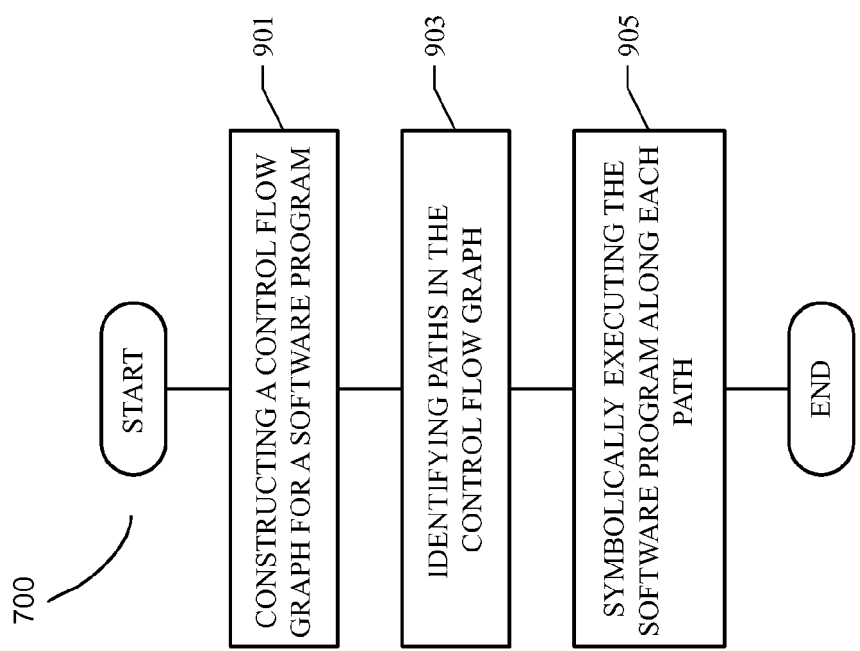
FIG. 9 illustrates an example method for performing symbolic execution on a software program written in JAVASCRIPT language.

FIG. 9 illustrates an example method 900 for performing symbolic execution on a software program. In particular embodiments, symbolic execution may be performed by a symbolic execution component 170 illustrated in FIG. 1. Particular embodiments may construct a CFG for the software program, as illustrated in STEP 901 (e.g., using the method illustrated in FIG. 3). In the CFG, there are one or more paths, each formed by a number of nodes linked by a number of directed edges, and these paths represent the possible execution paths of the software program. Particular embodiments may identify one or more specific paths in the CFG, as illustrated in STEP 903, and symbolically executing the software program along each identified path, as illustrated in STEP 905.

For a software program, the multiple possible execution paths result from various types of conditional statements in the source code, such as, for example and without limitation, "if-else", "for", "while", or "case". Considering the following sample code segment that includes an "if-else" statement.

| SAMPLE CODE 5 | |
|---|---|
| 1 | if (x > 0) |
| 2 | y = x + 10; |

| SAMPLE CODE 5 | |
|---|---|
| 3 | else |
| 4 | y = x − 5; |

In SAMPLE CODE 5, there are two possible execution paths resulting from the "if-else" conditional statement, depending on the value of variable "x". First, if "x" has a value greater than 0, then line 2 is executed such that "y=x+10". Second, if "x" has a value less than or equal to 0, then line 4 is executed such that "y=x−5". Here, the path condition involves variable "x", and the branching of the path depends on whether "x>0" holds true.

As another example, considering the following sample code segment that includes a "while" loop.

| SAMPLE CODE 6 | |
|---|---|
| 1 | i = 10; |
| 2 | t = 0; |
| 3 | while (i > 0) { |
| 4 | t = t + i; |
| 5 | i--; |
| 6 | } |

In this example, there are ten possible execution paths, one corresponding to each iteration of the "while" loop. Which specific path is executed depends on the value of variable "i". The loop terminates when the value of variable "i" reaches 0.

Given a specific path, there may be one or more variables accessed along the path, and there may be one or more constraints that, if satisfied, cause the control flow of the program to proceed along this path. Some of the variables accessed along the path may be a part of the constraints associated with the path. For example, in SAMPLE CODE 5, the value of the "x" variable determines along which path to proceed, and thus, "x" is involved in the constraints associated with the paths. On the other hand, the "y" variable is not a part of the branching condition and its value does not determine along which path to proceed, and thus, "y" is not involved in the constraints associated with the paths even though "y" is accessed along each path.

In particular embodiments, given a specific path in the CFG, symbolically executing the software program along this path results in a mathematical expression that represents the constraints associated with the path. If these constraints are satisfied, then the control flow of the program proceeds along this path. The mathematical expression may be solved using, for example, a Satisfiability Modulo Theory (SMT) solver. If there is any solution to the mathematical expression (i.e., the mathematical expression is solvable), then the path is feasible (i.e., it is possible to find a set of input values that cause this path to be executed). On the other hand, if the mathematical expression is unsolvable (i.e., there is no solution that can possibly satisfy the mathematical expression), then the path is unfeasible (i.e., there is no possible set of input values that can cause this path to be executed).

If the path is identified as unfeasible, then particular embodiments may report the path to software developers so that the path may be removed from the source code or modified so that it becomes feasible. If the path is identified as feasible, then particular embodiments may generate one or more sets of test cases (e.g., test input values) using the solutions to the mathematical expression. Various sets of test cases obtained in connection with various paths may be applied to the software program to validate the program.

For example, sometimes, a program may throw an Exception under certain conditions (e.g., an invalid mathematical operation such as dividing a number by 0, or accessing an illegal memory location). The Exception corresponds to a node in the CFG. Paths leading to this node corresponding to the Exception may be identified in the CFG. The software program may be symbolically executed along such a path so that a mathematical expression representing the constrains that, if satisfied, cause the control flow of the program to proceed along this path, which eventually results in the Exception to be thrown, may be obtained. The mathematical expression may be solved to generate test cases that cause the program to thrown the Exception.

As another example, taint analysis may be performed on a software program to prevent a bad location in the source code (e.g., a unreliable or untrustworthy function) from accessing a good object (e.g., a sensitive variable). There may be a path leading from a first node corresponding to a good variable to a second node corresponding to a bad function. The software program may be symbolically executed along such a path to obtain a mathematical expression representing the constrains associated with the path. The mathematical expression may be solved to determine whether the path is feasible, based on whether there is any solution to the mathematical expression. If the path is feasible, then the solutions may be used to modify the constraints so that the good variable is not accessed by the bad function.

Conversely, a good location in the source code (e.g., a sensitive function) should not access a bad object (e.g., a unreliable or untrustworthy variable). Again, there may be a path leading from a first node corresponding to the bad variable to a second node corresponding to the good function. The software program may be symbolically executed along such a path to obtain a mathematical expression representing the constrains associated with the path. The mathematical expression may be solved to determine whether the path is feasible, based on whether there is any solution to the mathematical expression. If the path is feasible, then the solutions may be used to modify the constraints so that the bad variable is not accessed by the good function. Alternatively, the solutions may be used to modify the bad variable so that whatever features or characteristics that make the variable bad (e.g., unreliable or untrustworthy) are removed. The variable may then be accessed by the good function, as it is no longer considered bad.

Figure 10:
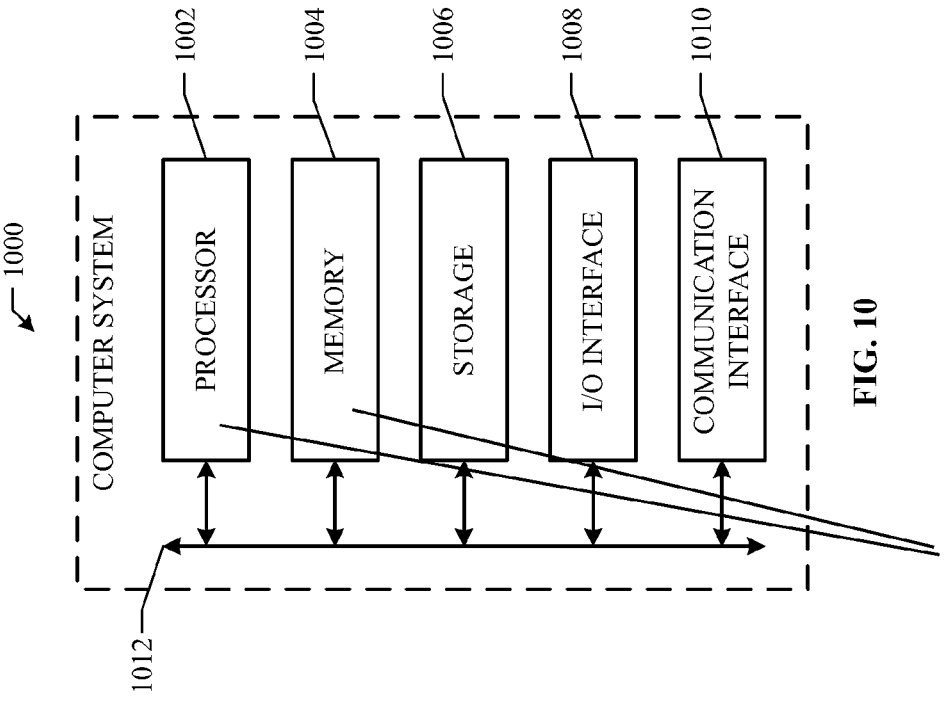
FIG. 10 illustrates an example computer system.

Particular embodiments may be implemented on one or more computer systems. For example, the methods described above may be implemented as computer software. FIG. 10 illustrates an example computer system 1000. In particular embodiments, one or more computer systems 1000 perform one or more steps of one or more methods 300, 400, 700, 800, 900 described or illustrated herein. In particular embodiments, one or more computer systems 1000 provide functionality described or illustrated herein. In particular embodiments, software running on one or more computer systems 1000 performs one or more steps of one or more methods 300, 400, 700, 800, 900 described or illustrated herein or provides functionality described or illustrated herein. Particular embodiments include one or more portions of one or more computer systems 1000.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-program (COM) or system-on-program (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1000 may include one or more computer systems 1000; be unitary or distributed; span multiple locations; span multiple machines; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include an HDD, a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 1002 (such as, for example, one or more internal registers or caches), one or more portions of memory 1004, one or more portions of storage 1006, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
   constructing a lambda object-oriented scripting language ("$\lambda_{JS}$") model for a software program written in object-oriented scripting language;
   converting the $\lambda_{JS}$ model to a continuation-passing style (CPS) model for the software program;
   constructing a control flow graph (CFG) for the software program based on the CPS model; and
   optimizing the CPS model of the software program, comprising merging a sequence of two or more "let" operations, the two or more "let" operations in the CPS model and generated based on the $\lambda_{JS}$ model, so that they are represented by a single node in the CFG.

2. The method of claim 1, further comprising parsing object-oriented scripting language source code of the software program.

3. The method of claim 1, wherein all implicit behaviors in object-oriented scripting language source code of the software program become explicit in the $\lambda_{JS}$ model.

4. The method of claim 1, wherein the CPS model consists of three types of operations: "let", "if", and "app".

5. A system comprising:
   a memory comprising instructions executable by one or more processors; and
   the one or more processors coupled to the memory and operable to execute the instructions, the one or more processors being operable when executing the instructions to:
   construct a lambda object-oriented scripting language ("$\lambda_{JS}$") model for a software program written in object-oriented scripting language;
   convert the $\lambda_{JS}$ model to a continuation-passing style (CPS) model for the software program;
   construct a control flow graph (CFG) for the software program based on the CPS model; and
   optimize the CPS model of the software program, comprising merging a sequence of two or more "let" operations so that they are represented by a single node in the CFG, the two or more "let" operations in the CPS model and generated based on the $\lambda_{JS}$ model.

6. The system of claim 5, wherein the one or more processors are further operable when executing the instructions to parse object-oriented scripting language source code of the software program.

7. The system of claim 5, wherein all implicit behaviors in object-oriented scripting language source code of the software program become explicit in the $\lambda_{JS}$ model.

8. The system of claim 5, wherein the CPS model consists of three types of operations: "let", "if", and "app".

9. One or more computer-readable non-transitory storage media embodying software operable when executed by one or more computer systems to:
   construct a lambda object-oriented scripting language ("$\lambda_{JS}$") model for a software program written in object-oriented scripting language;

convert the $\lambda_{JS}$ model to a continuation-passing style (CPS) model for the software program;

construct a control flow graph (CFG) for the software program based on the CPS model; and optimize the CPS model of the software program, comprising merging a sequence of two or more "let" operations so that they are represented by a single node in the CFG, the two or more "let" operations in the CPS model and generated based on the $\lambda_{JS}$ model.

10. The media of claim 9, wherein the software is further operable when executed by the one or more computer systems to parse object-oriented scripting language source code of the software program.

11. The media of claim 9, wherein all implicit behaviors in object-oriented scripting language source code of the software program become explicit in the $\lambda_{JS}$ model.

12. The media of claim 9, wherein the CPS model consists of three types of operations: "let", "if", and "app".

13. A system comprising:
means for constructing a lambda object-oriented scripting language ("$\lambda_{JS}$") model for a software program written in object-oriented scripting language;
means for converting the $\lambda_{JS}$ model to a continuation-passing style (CPS) model for the software program;
means for constructing a control flow graph (CFG) for the software program based on the CPS model; and
means for optimizing the CPS model of the software program, comprising means for merging a sequence of two or more "let" operations so that they are represented by a single node in the CFG, the two or more "let" operations in the CPS model and generated based on the $\lambda_{JS}$ model.

* * * * *